United States Patent [19]
Yap

[11] Patent Number: 5,611,008
[45] Date of Patent: Mar. 11, 1997

[54] SUBSTRATE SYSTEM FOR OPTOELECTRONIC/MICROWAVE CIRCUITS

[75] Inventor: Daniel Yap, Thousand Oaks, Calif.

[73] Assignee: Hughes Aircraft Company, Los Angeles, Calif.

[21] Appl. No.: 591,854

[22] Filed: Jan. 26, 1996

[51] Int. Cl.$^6$ .................................... G02B 6/12
[52] U.S. Cl. ..................... 385/14; 333/247; 359/188; 359/195; 385/49
[58] Field of Search .................... 333/246, 247; 385/14, 49; 257/432; 359/173, 188, 195

[56] References Cited

U.S. PATENT DOCUMENTS

| | | | |
|---|---|---|---|
| 4,904,036 | 2/1990 | Blonder | 385/14 |
| 5,138,436 | 8/1992 | Koepf | 333/247 X |
| 5,500,910 | 3/1996 | Boudreau et al. | 385/14 X |

OTHER PUBLICATIONS

Schlafer, John, et al., "Microwave Packaging of Optoelectronic Components", *IEEE Transactions on Microwave Theory and Techniques*, vol. 38, No. 5, May, 1990, pp. 518–522.

Wale, Michael, J., et al., "Self–Aligned Flip–Chip Assembly of Photonic Devices with Electrical and Optical Connections", *IEEE Transactions on Microwave Theory and Techniques*, vol. 38, No. 5, May, 1990, pp. 518–522.

Walden, R. H., et al., "Broadband Optoelectronic Integrated Receiver Front Ends", *Optical Fiber Communication* 1994 *Technical Digest*, Paper TuH4, p. 33.

Yap, Daniel, et al., "Wideband Impedance–Matched Integrated Optoelectronic Transmitter", *Integrated Optoelectronics for Communication and Processing*, SPIE vol. 1582, pp. 215–222.

Jackson, K. P., et al., "A High–Density, Four Channel, OEIC Transceiver Module", *Journal of Lightwave Technology*, vol. 12, No. 7, Jul. 1994, pp. 1185–1190.

*Primary Examiner*—Paul Gensler
*Attorney, Agent, or Firm*—V. D. Duraiswamy; W. K. Denson-Low

[57] ABSTRACT

A low-loss substrate system is provided for carrying and interconnecting optoelectronic/microwave circuits. The system includes a high-resistivity substrate, e.g., silicon of resistivity $>1\times10^3$ ohm-centimeter. A dielectric layer, e.g., silicon dioxide, is preferably deposited over at least a portion of the substrate. Low-loss microwave transmission members and passive microwave components, e.g., capacitors and spiral inductors, can be fabricated directly on the dielectric layer with thin-film techniques. Optoelectronic and microwave integrated circuits are preferably mounted on the substrate system with solder bumps and bonding pads. Other portions of the substrate can define grooves for receiving optical fibers. To enhance optical alignment, the grooves and bonding pads are preferably located with photolithographic techniques. The substrate system is especially suited for optoelectronic/microwave circuits that are realized with hybrid integration structures.

31 Claims, 3 Drawing Sheets

SUBSTRATE SYSTEM FOR OPTOELECTRONIC/MICROWAVE CIRCUITS

GOVERNMENT RIGHTS

The government has certain rights in this invention in accordance with MDA 972-94-3-0016 awarded by the Advanced Research Projects Agency (ARPA).

BACKGROUND OF THE INVENTION

1. Field of the Invention

The present invention relates generally to circuits of integrated optoelectronic devices and integrated microwave devices, and more particularly to substrates for such circuits.

2. Description of the Related Art

Optoelectronics pertains to the interaction of electronic processes with optical processes. This interaction is typically associated with energy conversion between electrical signals and optical signals. Optoelectronic devices, e.g., lasers, photodetectors, optical modulators and optical switches, are those devices in which this interaction takes place. Optoelectronic devices have been combined with microwave devices (devices operating in the signal region from around one gigahertz to several hundred gigahertz) to form optoelectronic/microwave circuits, e.g., transmitters, receivers and switching networks, which can be effectively used in various applications, e.g., optical-fiber communication links and signal-distribution networks.

Integration of optoelectronic/microwave modules has typically followed two paths—monolithic and hybrid. Monolithic integration places all active and passive components on the same substrate. In addition to reducing the overall circuit size, this process reduces parasitic inductances and capacitances because it shortens the length of circuit interconnect structures. Monolithic circuits are typically formed with compound semiconductor families, e.g., gallium aluminum arsenide (GaAlAs) and indium phosphide (InP), that inherently facilitate the realization of high resistivity substrates ( e.g., $1 \times 10^8$ ohm-centimeter) which reduce microwave losses and crosstalk in electrical interconnects.

In an exemplary monolithic structure, heterojunction bipolar transistor (HBT) technology and molecular-beam-epitaxy (MBE) are combined to realize a monolithic integrated p-i-n photodiode and transimpedance amplifier in the indium phosphide semiconductor family (Walden, R. H., et al., "Broadband Optoelectronic Integrated Receiver Front Ends", *Optical Fiber Communication* 1994 *Technical Digest*, Paper TuH4, p. 33).

Another exemplary monolithic integration was directed to an optoelectronic/microwave transmitter for wideband communication in the 1–4 GHz frequency range (Yap, Daniel, et al., "Wideband Impedance-Matched Integrated Optoelectronic Transmitter", *Integrated Optoelectronics for Communication and Processing*, SPIE Vol. 1582, pp. 215–222). The transmitter combines a GaAs/GaAlAs single-quantum-well (SQW) ridge-waveguide laser with a GaAs MESFET amplifier-driver. The circuit was fabricated on a semi-insulating GaAs substrate. After the active devices were isolated by an etching process, passive microwave components, e.g., metal-insulator-metal (MIM) capacitors, spiral inductors and bias tees, were fabricated directly on the substrate.

In contrast with monolithic integration, hybrid integration connects discrete devices with electrical interconnects. Although this approach generally results in larger circuit size and higher parasitics relative to monolithic circuits, semiconductor materials and fabrication processes can be independently selected to enhance the performance of each device. In addition, hybrid integrated circuits can be developed faster and with less cost than monolithic integrated circuits.

In both monolithic and hybrid integration, optical transmission members, e.g., optical fibers and optical waveguides, must be precisely aligned with optical ports of the optoelectronic devices. In the particular case of lasers, alignment tolerances of ~1 micron are typically required to restrict transmission loss penalties to less than 1 db.

In one approach to optical alignment (Schlafer, John, et al., "Microwave Packaging of Optoelectronic Components", *IEEE Transactions on Microwave Theory and Techniques*, Vol. 38, No. 5, May, 1990, pp. 518–522), discrete chips of optoelectronic devices, e.g., photodiodes and lasers, are mounted on high-resistivity substrates, e.g., diamond, ceramic and metal-polymer. The substrates are carried by a housing and optical fibers are secured to the housing with adjustable mounting blocks. Optical alignment is achieved by manually adjusting the fiber position while monitoring an output signal of the optoelectronic device. Although this structure can achieve satisfactory optical alignment, it is not suited to production because of its high demands on equipment and labor.

A more production-oriented, alignment structure uses flip-chip, solder-bump technology and V-shaped, substrate grooves (Wale, Michael, J., et al., "Self-Aligned Flip-Chip Assembly of Photonic Devices with Electrical and Optical Connections", *IEEE Transactions on Microwave Theory and Techniques*, Vol. 38, No. 5, May, 1990, pp. 518–522). An array of wettable interconnect pads are precisely positioned on a substrate carrier and on an optoelectronic device with photolithographic techniques. The grooves are formed in the substrate by anisotropic etching. They are configured and arranged to receive and position the optical fibers in a predetermined spatial location relative to the interconnect pads. The optoelectronic device is flipped over and the solder bumps positioned between the metal interconnect pads of the device and the substrate. Subsequent heating of the solder bumps causes them to reflow and their surface tension pulls the opposing interconnect pads into alignment. In a variation of this alignment structure, the optical fiber is replaced by an optical waveguide which is fabricated in the substrate carrier (Jackson, K. P., et al., "A High-Density, Four Channel, OEIC Transceiver Module", *Journal of Lightwave Technology*, Vol. 12, No. 7, July 1994, pp. 1185–1190).

In these latter alignment structures, the substrate carrier essentially functions as an optical bench for alignment of optoelectronic devices with optical transmission members. Passive microwave components must be realized on independent substrates, i.e., as chips, and electrical interconnects are limited to lossy structures, e.g., bond wires and ribbons. Although acceptable for monolithic devices, such carriers are not suitable for combining low-cost hybrid integrated circuits and compact, thin-film passive microwave components into optoelectronic/microwave circuits.

SUMMARY OF THE INVENTION

The present invention is directed to a substrate system which facilitates the optical alignment of optoelectronic devices and optical fibers while also facilitating the fabrication of low-loss microwave transmission members and passive microwave components which can be combined with the optoelectronic devices and with microwave devices to form optoelectronic/microwave circuits.

This goal is realized by providing a low-loss substrate and depositing a dielectric layer over at least a portion of the substrate. Microwave transmission members and passive microwave components (e.g., capacitors and inductors) are fabricated (e.g., with thin-film techniques) directly on the dielectric layer.

The microwave transmission members can include a plurality of first bonding pads which are positioned to align with matching bonding pads on integrated optoelectronic devices, and a plurality of second bonding pads which are positioned to align with matching bonding pads on integrated microwave devices. The bonding pads are configured to facilitate solder-bump connections between the integrated circuits and the dielectric layer. The solder bumps can be reflowed to enhance the alignment between respective bonding pads.

A groove is preferably formed in a portion of the substrate and configured to receive an optical fiber. The first bonding pads and the groove are positioned to optically align the optical fiber with an optical port of the optoelectronic device.

The invention facilitates the fabrication of passive microwave components, directly on the dielectric layer. These components have lower loss, greater bandwidth, use less area and are more compatible with high-volume production than their chip-mounted (i.e., having an independent substrate) counterparts.

The invention also facilitates the fabrication of microwave transmission members, e.g., coplanar transmission lines, directly on the dielectric layer. These structures have less loss and wider bandwidth than interconnect structures such as wire bonds and ribbons.

In one embodiment, the low-loss substrate is high-resistivity (e.g., $>1\times10^3$ ohm-centimeter) silicon and the dielectric layer is silicon dioxide. In other embodiments, the substrate is a ceramic, e.g., alumina or quartz. Although the dielectric layer provides further reduction of microwave loss, the high-resistivity substrates can be used independently in other embodiments of the invention.

The substrate systems of the invention facilitate the use of optoelectronic and microwave devices that are realized in hybrid integration techniques in which semiconductor materials and fabrication processes are independently selected to enhance the performance of each device.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
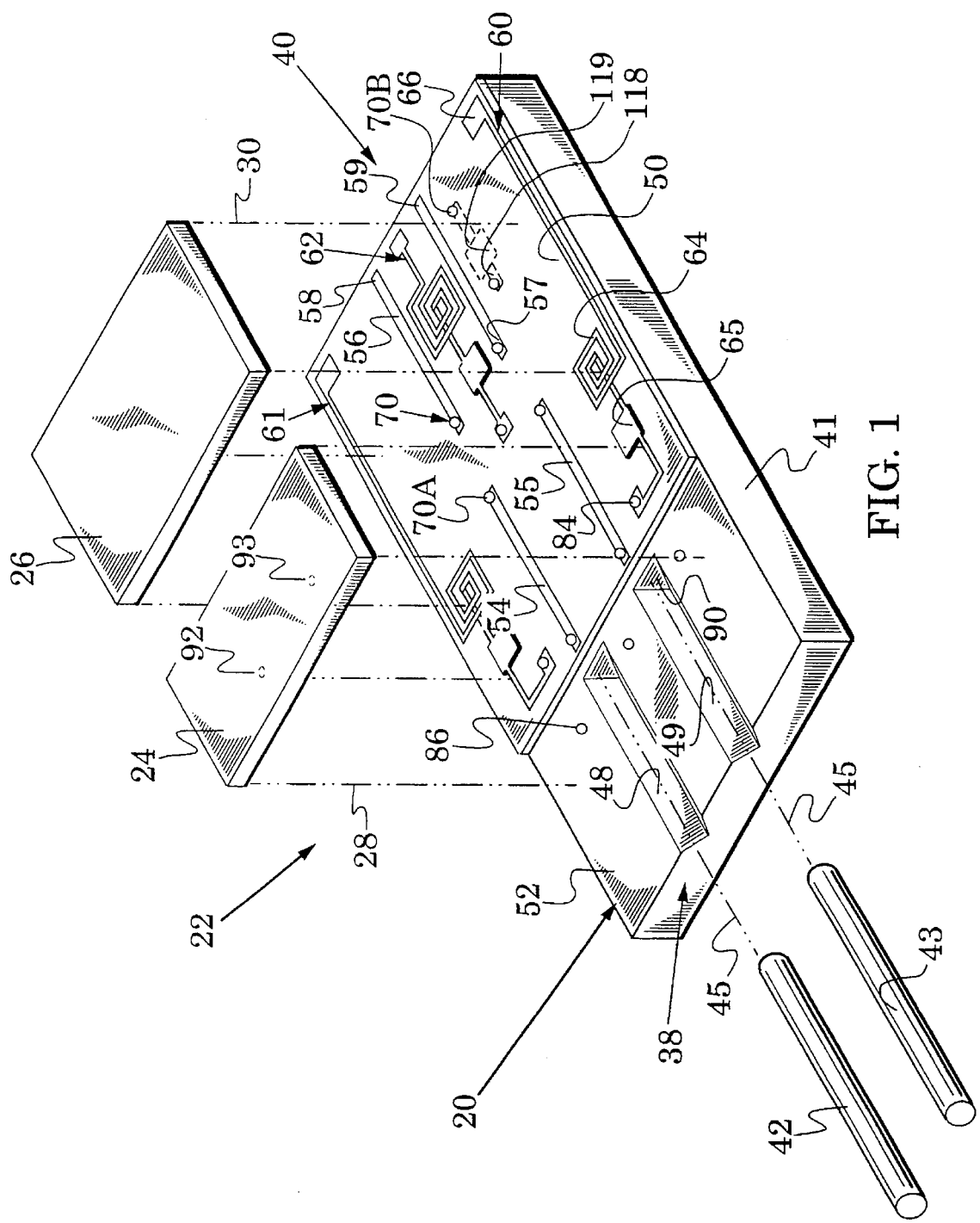
FIG. 1 is a partially exploded, perspective view of a substrate system in accordance with the present invention, shown in association with other elements of an optoelectronic/microwave receiver.

FIG. 1 is a perspective view of a substrate system 20 in accordance with the present invention. For illustrative purposes, the substrate system 20 is shown in association with various optoelectronic and microwave elements which, together with the substrate system 20, constitute an exemplary optoelectronic/microwave circuit in the form of a dual-channel receiver 22.

In particular, a dual-channel, optoelectronic photodetector 24 and a dual channel, microwave preamplifier 26 are carried on the substrate system 20 as indicated by respective, broken installation lines 28 and 30. The photodetector 24 and preamplifier 26 are also interconnected by the substrate system 20 to define a dual-channel, optical input port 38 and a dual-channel, microwave output port 40. The input port 38 is configured to receive a pair of optical fibers 42 and 43 as indicated by the broken installation lines 45.

In operation, optical signals are conducted through the optical fibers 42 and 43 to the input port 38 and converted into microwave signals by the photodetector 24. The microwave signals are coupled through portions of the substrate system 20 to the preamplifier 26. After amplification in the preamplifier 26, amplified microwave signals are coupled through other portions of the substrate system 20 to the output port 40.

Further operational description of the receiver 22 will be facilitated by preceding it with the following detailed structural description of the substrate system 20. The system 20 includes a silicon substrate 41, a pair of V-shaped grooves 48 and 49 and a dielectric layer 50. The grooves 48 and 49 are formed in an upper surface 52 of the substrate 41 and the dielectric layer 50 is positioned over at least a portion of the upper surface 52.

The substrate system 20 also includes microwave transmission members 54 and 55, which are arranged to communicate microwave signals between the photodetector 24 and the preamplifier 26, and microwave transmission members 56 and 57 which are arranged to communicate amplified microwave signals between the preamplifier 26 and the output port 40. In the receiver 22, the input port 38 is defined by the grooves 48 and 49 and the output port 40 is formed by the ends 58 and 59 of the microwave transmission members 56 and 57.

The substrate system 20 further includes voltage interconnect lines 60 and 61, which are arranged to couple dc supply voltages to the photodetector 24, and voltage interconnect line 62 which is arranged to couple a dc supply voltage to the preamplifier 26. The interconnect line 60 is configured to form a series inductor 64 and arranged in conjunction with a dielectric to form a shunt capacitor 65. The series inductor 64 and shunt capacitor 65 provide low-pass filtering between an applied dc voltage and the preamplifier 26. The interconnect line 60 widens at one end to form an external bonding pad 66 for application of the dc voltage. The interconnect lines 61 and 62 are structurally similar to the line 60.

The photodetector 24 and the preamplifier 26 are positioned on and connected to the substrate system 20 with the aid of solder bumps 70. The details of a typical solder bump connection are illustrated in the enlarged, sectional view of FIG. 2 which shows a solder bump 70A in association with the microwave transmission member 54 (these elements are also referenced in FIG. 1). The member 54 is formed with a film 72 of a metal, e.g., titanium, which adheres well to the dielectric layer 50. The metal film 72 is preferably covered with a film 74 of a protective and conductive metal, e.g., gold.

Figure 2:
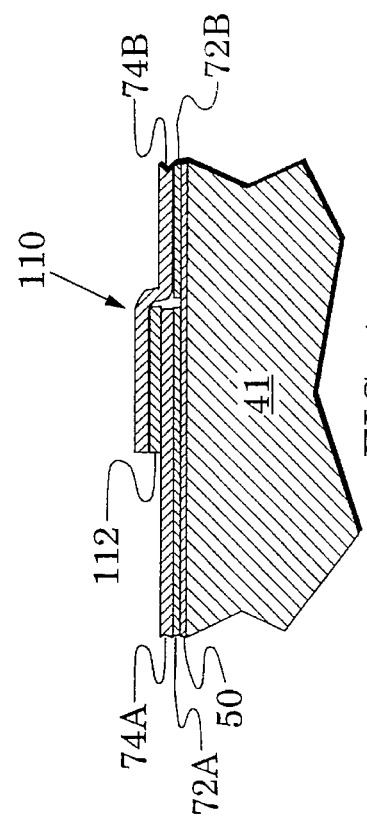
FIG. 2 is an enlarged, sectional view of a bonding pad in the receiver of FIG. 1.

A bonding pad 76 is formed by fabricating a "wettable" (i.e., capable of forming a bond with molten solder) metal sequence, e.g., titanium, nickel and gold, onto the film 74. The location and shape of the bonding pad 76 is defined by depositing a nonwettable dielectric 80, e.g., polyimide or silicon nitride, over the film 74 and, subsequently, forming a locating window 82 in the dielectric 80 (typically with the aid of patterned photoresist). The locating window 82 defines the location of the metal sequence. FIG. 2 illustrates that the photodetector 24 has a corresponding bonding pad 86. The bonding pad 86 is typically formed in a manner similar to that of the bonding pad 76.

The solder bump 70A, of a conventional solder composition, e.g., lead/tin or gold/tin, is then positioned between the bonding pads 76 and 86. For example, the material of the solder bump 70A can be initially electroplated over the bonding pad 76. When the solder bump 70A is reheated above its reflow temperature, its surface-tension forces act to bring the bonding pads 76 and 86 into alignment with each other.

Because locating windows, such as the window 82, can be precisely located, e.g., by photolithographic techniques, the solder bumps 70 and their associated bonding pads provide accurate positioning of the photodetector 24 and the preamplifier 26 on the substrate system 20. To enhance the surface-tension forces of the solder bumps, the locating windows 82 are preferably circular. They are dimensioned to produce a predetermined solder bump diameter (typically in the range of 20–50 microns).

FIG. 2 specifically illustrates solder bump and bonding pad structures in association with a microwave transmission member 55. This structure not only helps to position the photodetector 24 but completes a microwave signal path between the photodetector 24 and the transmission member 55. However, the same structure can connect non-microwave signals between the photodetector 24 and the substrate system 20, e.g., the solder bump and bonding pad 84 located at one end of the voltage interconnect line 60, or even be used solely for positioning purposes, e.g., the solder bump 86 between the photodetector 24 and the substrate 41.

An exemplary process for forming the V-shaped grooves 48 and 49 involves the application of a chemical etchant to the silicon substrate 50. As in the positioning of the bonding pads 76 of FIG. 2, the grooves are preferably positioned with photolithographic techniques. A coating of a material which resists the chemical etchant, e.g., silicon nitride, is placed over the substrate 41 and a locating window established in the coating. The etchant is then applied through the locating window and allowed to create the grooves 48 and 49 and a sloped plane at the inner end of each groove. These planes are subsequently coated with a reflective coat, e.g., of titanium and gold, to form mirrors 90 which can be used to complete optical paths between the optical fibers 42 and 43 and optical ports 92 and 93 of the photodetector 24.

In an exemplary assembly procedure, the bonding pads (76 in FIG. 2) of the substrate system 20 are electroplated with solder bumps (70A in FIG. 2). The integrated-circuit photodetector 24 and the integrated-circuit preamplifier 26 (which are each typically fabricated over an independent substrate) are rotated to face their substrates away from the substrate system 20 (this process results in what is conventionally termed a "flip-chip" orientation) and placed upon the substrate system 20 with a conventional "pick-and-place" instrument. The accuracy of this placement is sufficient to place the bonding pads of the photodetector 24 and the preamplifier 26 in contact with their corresponding solder bumps 70. The substrate system 20 is then heated to reflow the solder bumps 70 and permit their surface-tension forces to enhance the alignment of the respective bonding pads.

The optical fibers 42 and 43 are inserted into their respective grooves 48 and 49 and fixed in place with a suitable epoxy. Alternatively, the ends of the fibers 42 and 43 and the sides of the grooves 48 and 49 can be metallically plated and the fibers fixed in place by a solder reflow operation that is conducted simultaneously with the reflow operation that is associated with the bonding pads.

In operation of the receiver 22, optical signals are conducted through the optical fibers 42 and 43 and are reflected from the mirrors 90 into the optical ports 92 and 93 of the photodetector 24. In response to the optical signals, microwave signals are generated by the photodetector 24 and these latter signals are conducted to the preamplifier over the microwave transmission members 54 and 55. In response, the preamplifier produces amplified microwave signals which are conducted to the output port 40 by the microwave transmission members 56 and 57.

The alignment of the optical path between the fibers 42 and 43 and the photodetector's optical ports 92 and 93 is enhanced by the structure of the substrate system 20, which facilitates the use of photolithographic processes to position the grooves 48 and 49 and the bonding pads 76. With these processes, errors in the optical path can be reduced to a very small figure, e.g., on the order of 1–2 microns.

In a feature of the invention, the substrate system 20 is configured to facilitate low-loss microwave transmission between the elements of the receiver 22. In particular, a high-resistivity silicon, e.g., $>1\times10^3$ ohm-centimeter, is selected for the substrate 41. Although low-loss microwave transmission can be conducted over this high-resistivity silicon substrate, microwave-transmission loss is further reduced by the addition of the dielectric layer 50. When the dielectric is silicon dioxide, a thickness of several thousand angstroms is generally sufficient to obtain this reduction.

For clarity of illustration in FIG. 1, structural details of the microwave transmission structures, e.g., the transmission members 54–57, of the substrate system 20 are not included. Although these transmission structures can be realized with a variety of conventional microwave transmission-line arrangements, e.g., slot line and microstrip, the substrate system 20 is especially suited to the use of coplanar transmission-line structures.

Figure 3:
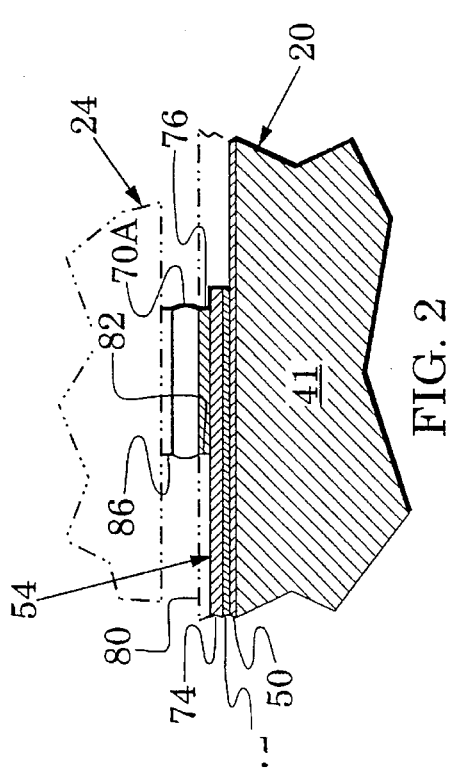
FIG. 3 is an enlarged view of a microwave transmission member in the substrate system of FIG. 1 with the member realized in a coplanar structure.

As illustrated in the exemplary transmission line 100 of FIG. 3, coplanar structures surround a microwave signal line 102 with a pair of ground planes 104 and 105. This arrangement concentrates microwave field lines in the plane of the signal line and the ground planes. Because this limits the field lines which extend into the substrate 41, the low-loss transmission of the substrate system 20 is further enhanced. Transmission losses of ~0.7 db/centimeter and ~1.2 db/centimeter have been measured at 4 GHz and 20 GHz respectively, in a coplanar transmission line which was fabricated over a high-resistivity silicon substrate and a silicon dioxide dielectric layer. The use of the silicon dioxide layer reduced the effective loss tangent of the high-resistivity silicon substrate from ~0.04 to ~0.008 for a fivefold improvement.

Figure 4:
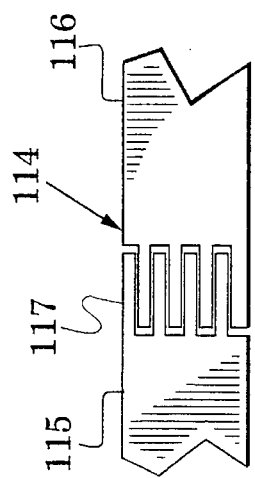
FIG. 4 is an enlarged, sectional view of a microwave capacitor in the substrate system of FIG. 1.

The low-loss microwave characteristics of the substrate 41 and dielectric layer 50 also facilitate the realization of various passive microwave components directly on the substrate system 20 (i.e., without the need for independent substrates). These passive microwave components enhance communication between the photodetector 24 and the preamplifier 26 (e.g., by matching impedances and providing filtering). For example, FIG. 4 illustrates an exemplary microwave capacitor 110 structure which is positioned over a substrate 41 and a dielectric layer 50. The capacitor 110 includes a dielectric layer 112, e.g., silicon nitride, which is deposited over a transmission signal line of metal films 72A and 74A which are similar to the metal films 72 and 74 of FIG. 2. A second transmission line of metal films 72B and 74B extends over the top of the dielectric 112. The transmission signal lines thus form the spaced plates of a capacitor.

Figure 5:
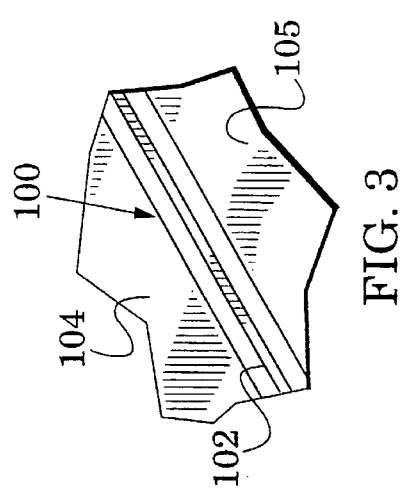
FIG. 5 is an enlarged plan view of another microwave capacitor embodiment which is suitable for use in the substrate system of FIG. 1.

Capacitors with a smaller capacitance can be photolithographically formed with an interdigital structure as shown in the capacitor 114 of FIG. 5, in which two microwave signal lines 115 and 116 have a plurality of interdigitated fingers 117.

The spiral inductor 64 of FIG. 1 illustrates an exemplary microwave inductor which can be included in the low-loss substrate systems of the invention. Crossovers (in which one portion of the microwave signal line crosses over other signal line portions) can be conventionally realized with air bridges or by interposing a dielectric, e.g., silicon nitride, between the signal line portions.

The teachings of the invention also facilitate the positioning of low-loss microwave transmission members and passive microwave components on the substrate system 20 for conduction of microwave signals between the portions of an integrated circuit. For example, a microwave transmission member 118 and a series-connected capacitor 119 are shown in broken lines in FIG. 1. These microwave elements can be arranged, e.g., as an impedance-matching circuit, between portions of the preamplifier 26 by means of solder bumps, e.g., the solder bump 70B (in this example, similar microwave elements might also be arranged to connect portions of the other channel of the preamplifier 26).

Although the substrate system 20 has been illustrated to include a high-resistivity substrate 41 or a high-resistivity substrate 41 with a dielectric layer 50, the teachings of the invention may be practiced with other low-loss substrate systems. For example, the silicon substrate 41 can be replaced by a substrate formed from various ceramics, which inherently have resitivities>$1 \times 10^3$ ohm-centimeter. Because of the excellent low-loss microwave characteristics of ceramics, the dielectric layer 50 is preferably eliminated in these embodiments of the invention. Although some ceramics, e.g., alumina, would require that the locating grooves 48 and 49 of FIG. 1 be machined, the grooves can be chemically etched into other ceramics, e.g., quartz.

The metal films 72 and 74 and the metal sequence of the bonding pad 76 can be deposited by conventional thin-film processes, e.g., evaporation, sputtering and electroplating. In particular, a sufficient thickness of nickel and gold may more easily be obtained with electroplating. Other conventional metal sequences can also be used to realize the bonding pads 76, e.g., an evaporated sequence of titanium and platinum.

Figure 6:
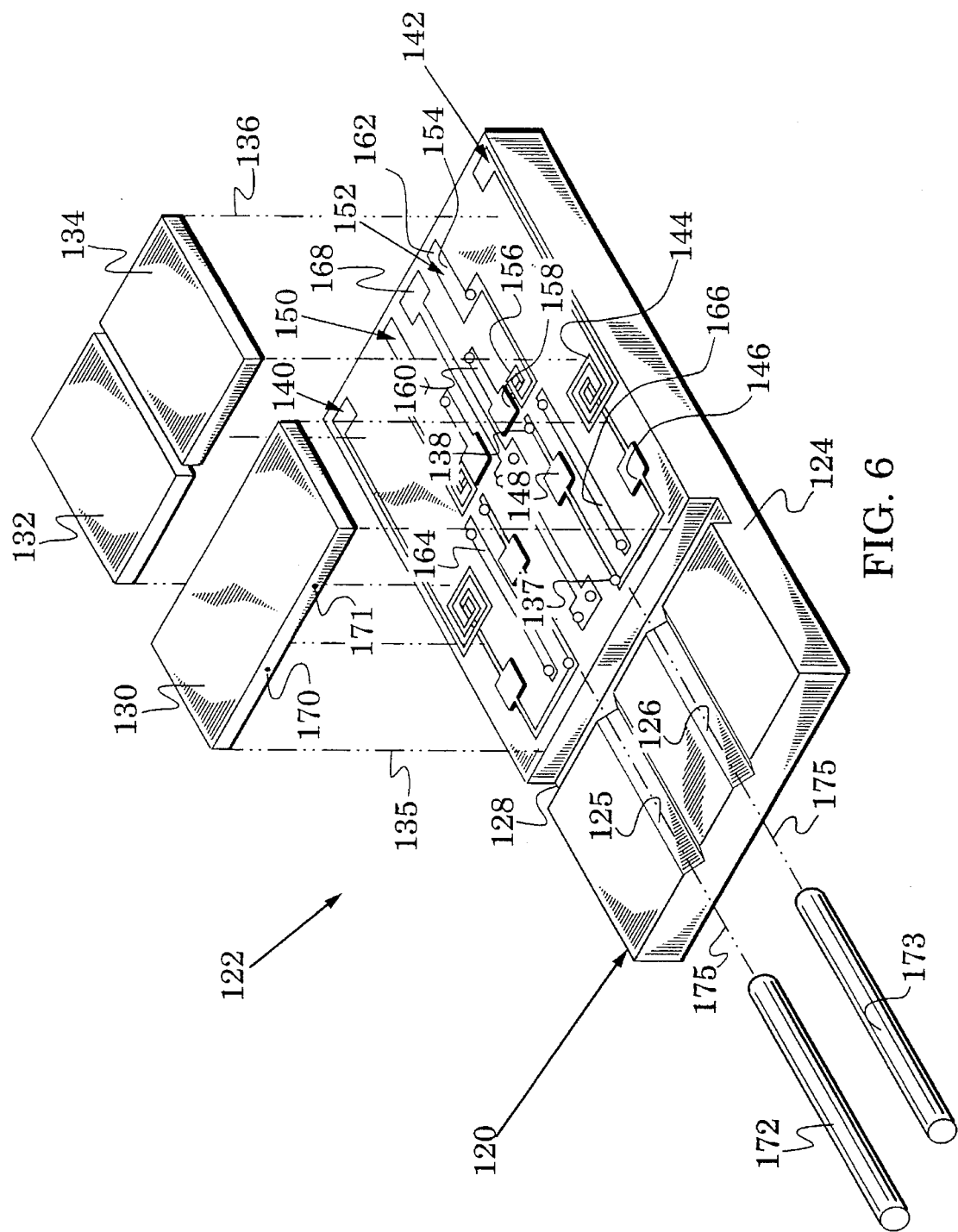
FIG. 6 is a partially exploded, perspective view of another substrate system in accordance with the present invention, shown in association with other elements of an optoelectronic/microwave transmitter.

The use of passive microwave components that are fabricated directly on substrate systems of the invention is further illustrated in FIG. 6, which illustrates another substrate system 122. The substrate system 122 comprises part of another optoelectronic/microwave circuit in the form of a transmitter 122.

The substrate system 120 incudes a machinable ceramic substrate 124 which has been machined to define a pair of grooves 125 and 126 and a channel 128 which is orthogonally positioned across the grooves. A dual-channel laser 130 and a pair of amplifier drivers 132 and 134 are carried on the substrate 124 as indicated by broken installation lines 135 and 136. They are positioned and interconnected with structures, e.g., solder bumps 137 and 138, which are similar to those described above in the circuit 20 of FIG. 1.

Voltage interconnect lines 140 and 142 couple dc voltages to the laser 130 and the drivers 132 and 134. The line 142 includes a series inductor 144 and shunt capacitor 146 in a configuration similar to that of the interconnect line 60 of FIG. 1. The line 142 supplies a dc voltage to the laser 130 through the solder bump 137. The line 142 is also extended underneath the driver 134 and supplies a dc voltage to the driver through the solder bump 138. A filter capacitor 148 shunts the line 142 to ground between the solder bumps 136 and 138. The interconnect line 140 is configured similar to the line 142.

A pair of microwave impedance-matching circuits 150 and 152 are positioned at one end of the substrate 124. The circuit 152 includes a microwave transmission member 154, a series inductor 156, a shunt capacitor 158 and another microwave transmission member 160. The circuit 152 is configured to provide an impedance match between the driver 134 and a microwave source which is connected at the end 162 of the member 154. The impedance-matching circuit 150 is similar to the circuit 152 and provides impedance matching for the input of the driver 132.

The substrate system 120 incudes a pair of microwave transmission members 164 and 166 which connect the drivers 132 and 134 with the laser 130. The system 120 also includes a ground strip 168 which provides isolation between the dual channels of the transmitter 122.

The channels of the laser 130 have output ports 170 and 171. Optical fibers 172 and 173 are received into the grooves 125 and 126 and secured in a manner similar to that described in the circuit 20 of FIG. 1. In etching or machining operations, it is difficult to obtain a sharply defined end for the grooves 125 and 126. The channel 128 insures that the fibers 172 and 173 can be urged inward to abut the optical output ports 170 and 171 of the laser 130 as indicated by broken installation lines 175.

In operation of the transmitter 122, microwave input signals are conducted through the impedance matching circuits 150 and 152 to the drivers 132 and 134. These signals are amplified in the drivers and the amplified microwave signals are conducted to the laser 130 by transmission members 164 and 166. In response to the amplified microwave signals, optical signals are generated by the laser 130 and the optical signals are coupled from the output ports 170 and 171 to the optical fibers 172 and 173.

As in the receiver 20 of FIG. 1, optical alignment of the fibers 172 and 173 with the output ports 170 and 171 is enhanced by the use of photolithographic processes to position the grooves 125 and 126 and the bonding pads which locate the laser 130 and the drivers 132 and 134.

Because of their low-loss characteristics, microwave transmission members and passive microwave components can be fabricated directly on the substrate systems of the invention. This facilitates the use of hybrid integrated devices in which semiconductor materials and fabrication processes are selected independently to enhance the performance of each device. The need for bulky, passive microwave chips (which are formed on independent substrates) is eliminated. Compact optoelectronic/microwave circuits are realized when these substrate systems are combined with photolithograpic techniques for alignment of optical paths between the circuits and external optical fibers.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A substrate system for carrying and interconnecting an optoelectronic/microwave circuit with the aid of a plurality of solder bumps, said optoelectronic/microwave circuit including an optical fiber, an optoelectronic integrated circuit which has an optical port and a plurality of bonding pads, and a microwave integrated circuit which has a plurality of bonding pads, said microwave integrated circuit adapted for communication with said optoelectronic integrated circuit through a first microwave signal and adapted for communication externally from said optoelectronic/microwave circuit through a second microwave signal, said substrate system comprising:

a substrate;

a groove formed in said substrate;

a dielectric layer positioned over at least a portion of said substrate;

a plurality of microwave transmission members carried on said dielectric layer and configured to carry microwave signals;

a plurality of first bonding pads formed on said dielectric layer; and a plurality of second bonding pads formed on said dielectric layer;

wherein:
said groove is configured to receive said fiber;
said first bonding pads are positioned to align with said bonding pads of said optoelectronic integrated circuit and configured to be connected to said bonding pads of said optoelectronic integrated circuit with a plurality of said solder bumps;
said second bonding pads are positioned to align with said bonding pads of said microwave integrated circuit and configured to be connected to said bonding pads of said microwave integrated circuit with a plurality of said solder bumps;
said groove and said first bonding pads are arranged to optically align said optical fiber and said optical port; and one of said microwave transmission members is arranged to couple said first microwave signal between said optoelectronic integrated circuit and said microwave integrated circuit.

2. The substrate system of claim 1, wherein one of said microwave transmission members is arranged to couple said second microwave signal away from said microwave integrated circuit.

3. The substrate system of claim 1, wherein said microwave transmission members include coplanar transmission lines.

4. The substrate system of claim 1, wherein said microwave transmission members include microstrip transmission lines.

5. The substrate system of claim 1, wherein said substrate comprises silicon.

6. The substrate system of claim 5, wherein said substrate has a resistivity greater than $1 \times 10^3$ ohm-centimeter.

7. The substrate system of claim 1, wherein said dielectric layer comprises silicon dioxide.

8. The substrate system of claim 1, wherein one of said microwave transmission members is arranged to join one of said first bonding pads and one of said second bonding pads.

9. The substrate system of claim 1, wherein one of said microwave transmission members is arranged to join one of said first bonding pads with another of said first bonding pads.

10. The substrate system of claim 1, wherein one of said microwave transmission members is arranged to join one of said second bonding pads with another of said second bonding pads.

11. The substrate system of claim 1, further including a channel formed in said substrate and positioned across said groove to permit said optical fiber to abut said optical port.

12. The substrate system of claim 1, wherein:
said optical fiber and said optical port are aligned along an optical path; and
said groove includes a mirrored plane which is positioned across said optical path.

13. The substrate system of claim 1, wherein one of said microwave transmission members forms a spiral inductor to enhance said communication.

14. The substrate system of claim 1, wherein first and second ones of said microwave transmission members are spaced apart and further including a dielectric member positioned between said first and second microwave transmission members to form a capacitor to enhance said communication.

15. The substrate system of claim 1, wherein first and second ones of said microwave transmission members have interdigitated fingers forming a capacitor to enhance said communication.

16. A substrate system for carrying and interconnecting an optoelectronic/microwave circuit with the aid of a plurality of solder bumps, said optoelectronic/microwave circuit including an optical fiber, an optoelectronic integrated circuit which has an optical port and a plurality of bonding pads, and a microwave integrated circuit which has a plurality of bonding pads, said microwave integrated circuit adapted for communication with said optoelectronic integrated circuit through a first microwave signal and adapted for communication externally from said optoelectronic/microwave circuit through a second microwave signal, said substrate system comprising:

a substrate having an impedance greater than $1 \times 10^3$ ohm-centimeter;

a groove formed in said substrate;

a plurality of microwave transmission members carried on said substrate and configured to carry microwave signals;

a plurality of first bonding pads formed on said substrate; and a plurality of second bonding pads formed on said substrate;

wherein:
said groove is configured to receive said fiber;
said first bonding pads are positioned to align with said bonding pads of said optoelectronic integrated circuit and configured to be connected to said bonding pads of said optoelectronic integrated circuit with a plurality of said solder bumps;

said second bonding pads are positioned to align with said bonding pads of said microwave integrated circuit and configured to be connected to said bonding pads of said microwave integrated circuit with a plurality of said solder bumps;

said groove and said first bonding pads are arranged to optically align said optical fiber and said optical port; and one of said microwave transmission members is arranged to couple said first microwave signal between said optoelectronic integrated circuit and said microwave integrated circuit.

17. The substrate system of claim 16, wherein one of said microwave transmission members is arranged to couple said second microwave signal away from said microwave integrated circuit.

18. The substrate system of claim 16, wherein said microwave transmission members include coplanar transmission lines.

19. The substrate system of claim 16, wherein said microwave transmission members include microstrip transmission lines.

20. The substrate system of claim 16, wherein said substrate comprises silicon.

21. The substrate system of claim 16, wherein said substrate comprises a ceramic.

22. The substrate system of claim 16, further including a dielectric layer positioned between said substrate and said microwave transmission members.

23. The substrate system of claim 22, wherein said dielectric layer is silicon dioxide.

24. The substrate system of claim 16, wherein one of said microwave transmission members is arranged to join one of said first bonding pads and one of said second bonding pads.

25. The substrate system of claim 16, wherein one of said microwave transmission members is arranged to join one of said first bonding pads with another of said first bonding pads.

26. The substrate system of claim 16, wherein one of said microwave transmission members is arranged to join one of said second bonding pads with another of said second bonding pads.

27. The substrate system of claim 16, further including a channel formed in said substrate and positioned across said groove to permit said optical fiber to abut said optical port.

28. The substrate system of claim 16, wherein:

said optical fiber and said optical port are aligned along an optical path; and said groove includes a mirrored plane which is positioned across said optical path.

29. The substrate system of claim 16, wherein one of said microwave transmission members forms a spiral inductor to enhance said communication.

30. The substrate system of claim 16, wherein first and second ones of said microwave transmission members are spaced apart and further including a dielectric member positioned between said first and second microwave transmission members to form a capacitor to enhance said communication.

31. The substrate system of claim 16, wherein first and second ones of said microwave transmission members have interdigitated fingers forming a capacitor to enhance said communication.

* * * * *